United States Patent [19]
Leiper

[11] Patent Number: 6,031,516
[45] Date of Patent: Feb. 29, 2000

[54] INTEGRATED FILM AND FILMLESS IMAGE DISPLAY SYSTEM

[76] Inventor: Thomas W. Leiper, 216 Cascade Rd., Stamford, Conn. 06903

[21] Appl. No.: 09/109,674

[22] Filed: Jul. 2, 1998

Related U.S. Application Data

[63] Continuation-in-part of application No. 08/887,906, Jul. 3, 1997.

[51] Int. Cl.⁷ ...................................................... G09G 5/00
[52] U.S. Cl. ............................................................ 345/115
[58] Field of Search .................................. 345/115, 116, 345/352; 707/501

[56] References Cited

U.S. PATENT DOCUMENTS

| | | | |
|---|---|---|---|
| 5,019,976 | 5/1991 | Chiu et al. | 345/115 |
| 5,293,313 | 3/1994 | Cecil et al. | 345/115 |
| 5,608,538 | 3/1997 | Edgar et al. | 358/406 |
| 5,748,173 | 5/1998 | Gur | 345/115 |

*Primary Examiner*—Matthew Luu
*Attorney, Agent, or Firm*—St. Onge Steward Johnston & Reens LLC

[57] ABSTRACT

An integrated film and filmless image display system is provided comprising a film image display unit having a film viewer for displaying a plurality of film images, a computer system having a filmless image display unit for displaying a plurality of filmless images, and a controller for controlling display of either the film images or the filmless images, wherein either the plurality of film images or the plurality of filmless images are indexed relative to the other.

16 Claims, 6 Drawing Sheets

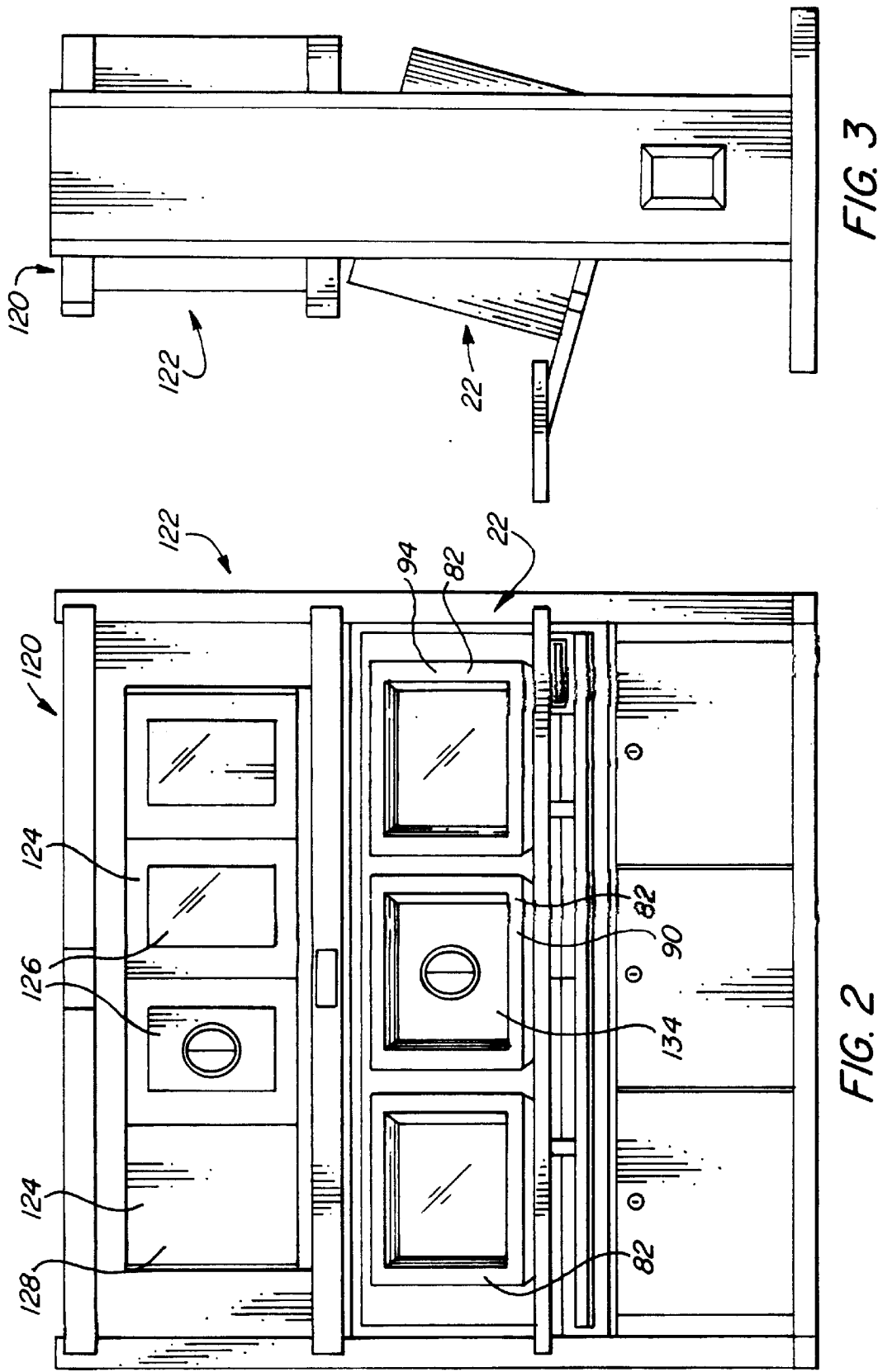

INTEGRATED FILM AND FILMLESS IMAGE DISPLAY SYSTEM

This is a continuation in part of pending U.S. application Ser. No. 08/887,906, filed Jul. 3, 1997, and entitled "System for Manipulation and Display of Medical Images."

FIELD OF THE INVENTION

The present invention relates generally to the field of image acquisition, management and display in medical applications, and more particularly to the field of radiology equipment.

BACKGROUND OF THE INVENTION

Radiographic images, such as X-ray films, and Magnetic resonance imaging ("MRI") and computerized tomograph (CT) transparencies have traditionally been reviewed by a diagnosing physician such as a radiologist on a film viewer, on which a series of images in a patient study are displayed in groups of two or more. Different image series, generated by processing the data captured during a patient scan in different ways, are typically provided. The different image series may display the same portions of the patient's anatomy but processing reduces the amount of information in the image to allow for films having sufficient pixel depth to provide the detail needed for diagnosis in the tissue of interest. The film viewer may be a static light box or a motorized film viewer. A motorized film viewer consists of vertically positioned light boxes and an endless belt on which the films are mounted and which passes the films in front of the light boxes. Motorized film viewers are controlled by the radiologist using foot pedals which activate the motorized viewer to cause the films to be moved to the left or to the right (or in some cases, up and down) to permit viewing of the desired portions of the film series. The images are usually presented in a standard sequence, usually in the order of image capture. The radiologist will typically dictate a medical study into a tape recorder while viewing the films, for later transcription. The films and transcribed dictation are stored in a patient's file.

Filmless image systems have also been proposed and used. Filmless systems have been used in connection with handling both MRI images, and computer tomography images generated by processing X-ray image data to generate a series of "slices" through the human body. Such systems historically have presented all the image data captured by the MRI or tomography equipment, as opposed to in film images (where the medical technician will expose films only for selected series of images of clinical interest). Filmless systems have been proposed in which a series of images are presented to the diagnosing physician simultaneously. One such system is described in U.S. Pat. No. 5,452,416 to Hilton.

U.S. Pat. No. 5,235,510 to Yamada et al. discloses a computer-aided diagnosis (CAD) system for medical use. The system generates digital images from medical images, such as X-ray film, computed tomography scans and magnetic resonance images, and creates a diagnosis of the digitized medical images using CAD algorithms. A disadvantage to this system is that a doctor may not be able to easily display and compare the digitized images and the non-digitized images at the same time.

Although a medical facility may have the technology to display and examine filmless images, a radiologist may desire to view film and filmless images at the same time. For instance, the radiologist may be comparing recent filmless images with past film images or may be comparing its filmless images with film images from another hospital.

What is desired, therefore, is a system in which medical personnel can display and compare corresponding film and filmless medical images at the same time.

SUMMARY OF THE INVENTION

It is an object of the present invention is to provide an apparatus in which medical personnel can display and compare corresponding film and filmless medical images at the same time to increase the diagnosing physician's efficiency and effectiveness.

It is another object of the invention to provide an apparatus of the above character having a control device that can manipulate the filmless medical images.

It is a further object of the invention to provide an apparatus of the above character wherein the control device can facilitate manipulation of the film and filmless images with respect to each other.

It is yet another object of the invention to provide an apparatus of the above character wherein the control device is handheld.

These objects of the invention are achieved by an integrated film and filmless image display system comprising a film image display unit having a film viewer for displaying a plurality of film images, a computer system having a filmless image display unit for displaying a plurality of filmless images, and a controller for controlling display of either the film images or the filmless images, wherein either the plurality of film images or the plurality of filmless images are indexed relative to the other.

BRIEF DESCRIPTION OF THE DRAWINGS

FIG. 2 is a front view of the integrated film and filmless image display system of FIG. 1.

FIG. 3 is a side view of the integrated film and filmless image display system of FIG. 1.

DETAILED DESCRIPTION OF THE INVENTION

Figure 1:
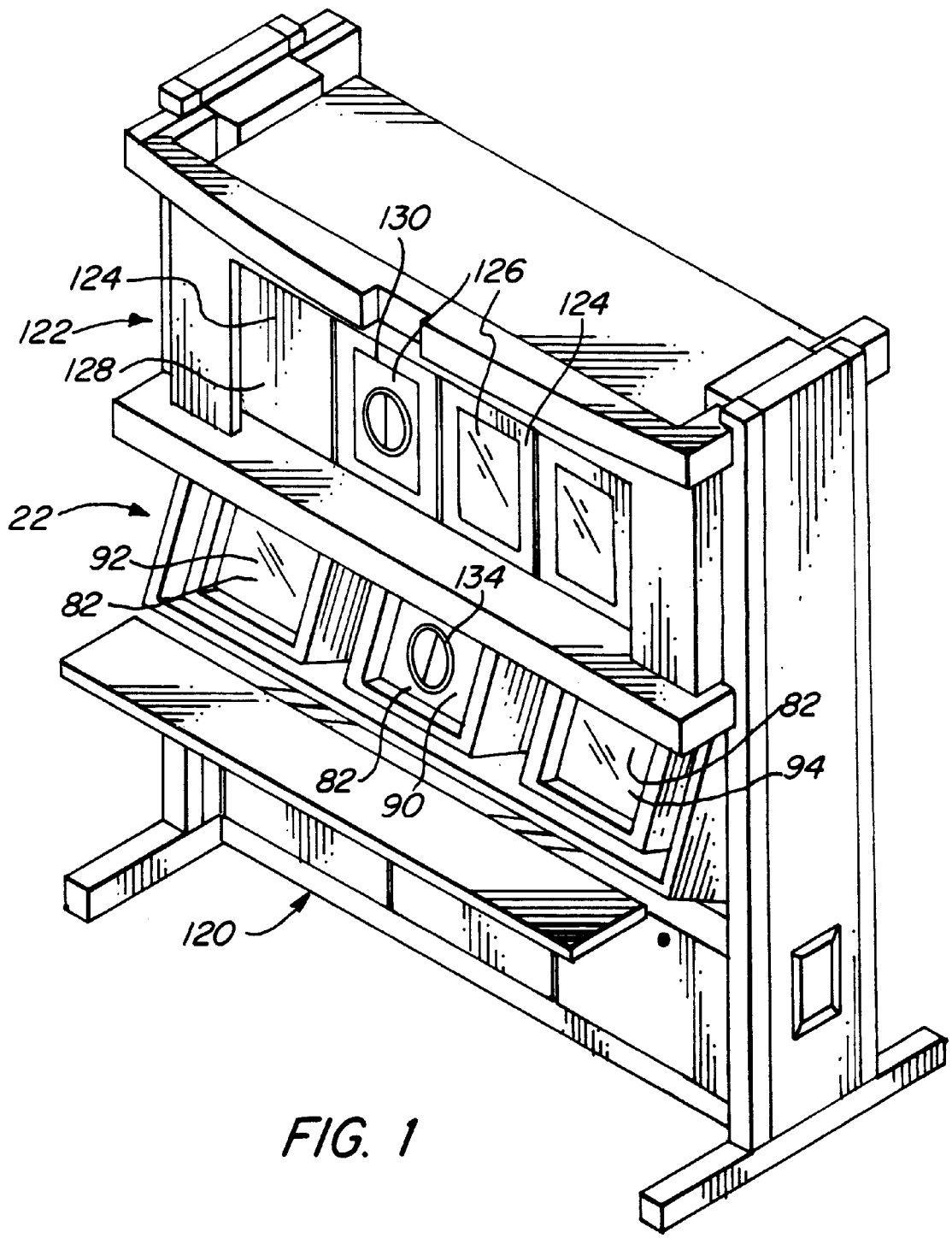
FIG. 1 is a front isometric view of the integrated film and filmless image display system in accordance with the present invention.

The integrated film and filmless image display system 120 in accordance with the invention is shown in FIGS. 1–3. The system comprises a film image display unit 122 and a computer system 22 having at least one filmless image display unit 82.

The film image display unit 122 comprises an endless film transport belt 128 having a number of positions 124 on which to place a film image 26, a motor for driving the transport belt, a motor control unit, an illumination device to illuminate the film images, and a mechanism for retaining the film images 26 upon the transport belt positions 124, such as clips or a friction fit mechanism. Each of transport belt positions 124 has an address by which the computer system 22 keeps track of the location of the belt positions 124. The address may be encoded and located next to the belt positions 124 themselves, as in the form of a bar code.

A detector is provided for reading the address information of the belt positions 124. The detector can be hand held, such as a bar code scanner, or can be fixedly located within the film image display unit 122 so that the detector reads the address information of each position 124 as it passes the detector. A motor control unit is also provided which can move the transport belt 128 such that a position having a selected address appears at an illuminated position 130 in front of the illumination device.

Figure 7:
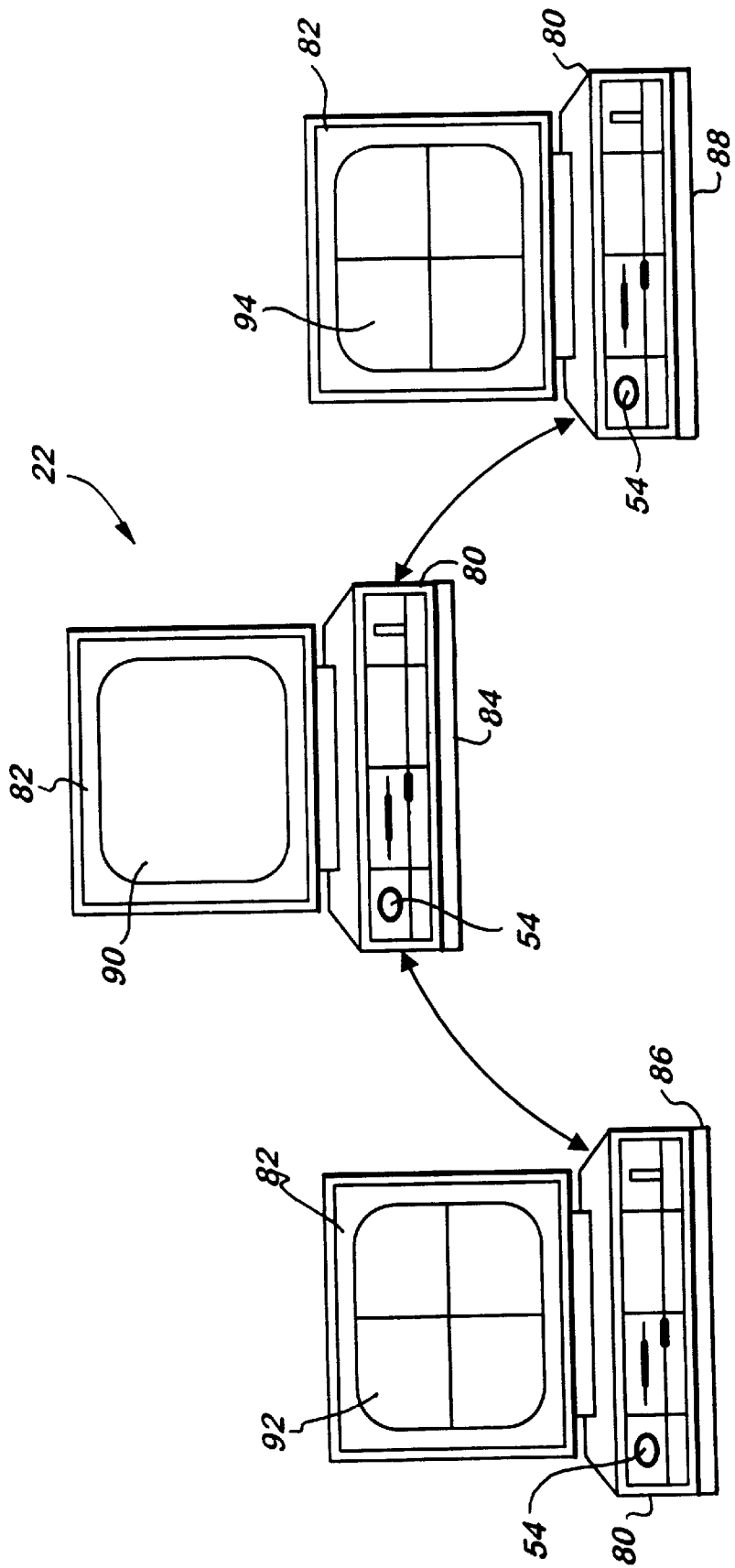
FIG. 7 is a front schematic illustration of the personal computers of a computer system for use with the integrated film and filmless image display system of FIG. 1.

Referring now to FIG. 7, the computer system 22 is preferably provided with at least one conventional personal computer or workstation system 80. Most preferably, computer system 22 comprises three conventional personal computer systems 80 which are linked together by a network system. Each personal computer system 80 is preferably a conventional personal computer such as an Intel processor based system running a Windows 95 (or later version) or Windows NT operating system. Each personal computer system 80 includes an image display unit 82, such as a 20 inch by 20 inch 0.28 dpi non interlaced monitor, random access memory (preferably a minimum of 32 megabytes, and more preferably 128 megabytes), means for digital data storage such as a hard disk drive, and an analog to digital conversion system for converting analog audio signals to digital format. The use of three linked personal computers provides a simple and effective way of driving three separate monitors, which can be independently controlled by the handheld controller 20, 40 or which can be controlled by the handheld controller 20, 40 via a selected "master" personal computer 84, with the flanking left personal computer 86 and right personal computer 88 acting as "slave" computers under the control of the "master" computer 84.

Figure 8:
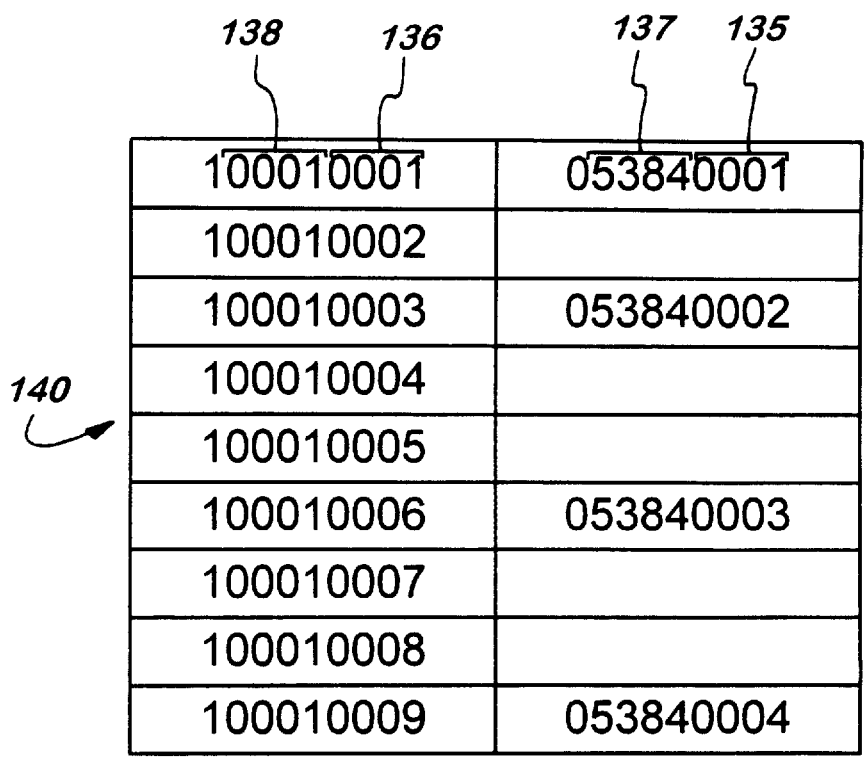
FIG. 8 is an illustration of an index with the film images being indexed relative to the filmless images.
Figure 9:
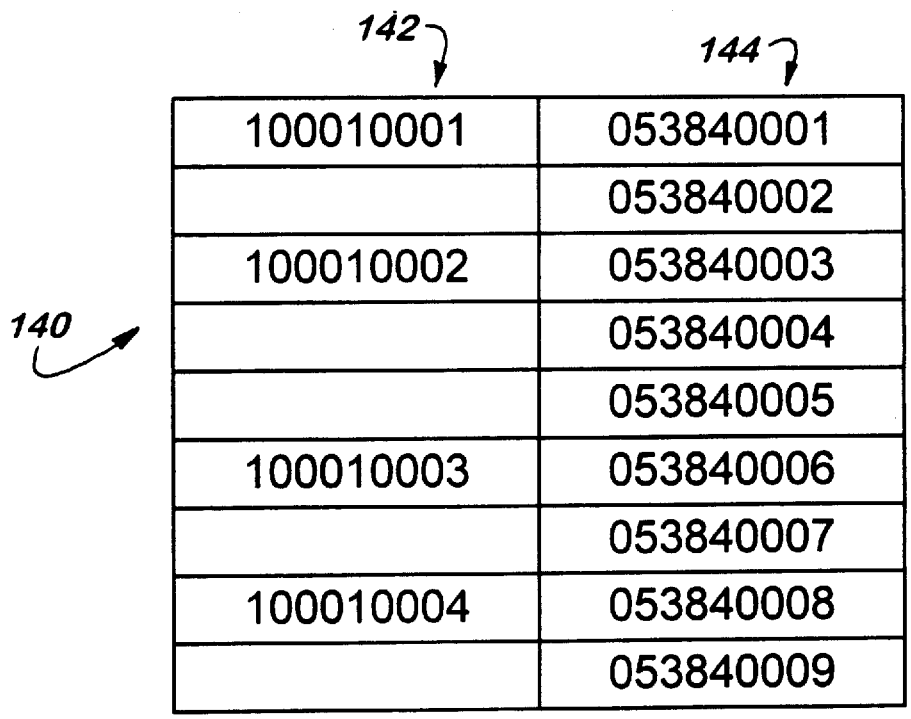
FIG. 9 is an illustration of an index with the filmless images being indexed relative to the film images.

Referring to FIGS. 8 and 9, the computer system 22 maintains a numeric or alphanumeric index table 140 either on the hard drive or the random access memory or both, but preferably on both while the computer system 22 is operating. The index table 140 can include the identification of one or more filmless image series names 138, the identification of each image in each film series 136, the identification of one or more of the series name of the film images 137 and the identification of the film images 135. The index 140 should also have for each film image the position address of the film image on the transport belt and for each filmless image the address of the digital filmless image in memory. The index 140 can contain other information for the film or filmless images, such as the patient's name, the name of the patient's physician, or the position of the film or filmless image in the series. The information for the film images 126 can be contained in a bar code, which can be located on the side of each film image 126 or at the front or rear of a series of film images. It should be apparent that many possible combinations of information can be included or omitted in the index without departing from the scope of the present invention.

For example, the filmless images index information 142 can comprise a nine digit number, wherein the terminal four digits 136 identify the number of the image in the series, and the second through fifth digits 138 indicate the number of the series. The film images index information 144 can have a similar or different format. Both the film images index information 144 and filmless images index information 142 would have address information. The filmless images index information 142 would describe the address where the images are located in computer memory, and the film images index information 144 would have information where the film images are located on the film transport belt 128.

The index 140 can include a cross reference between the film images 126 information and the filmless images 134 information to determine which images are related to each other. Preferably, the filmless images have cross references to related film images as shown in FIG. 8. It may be preferable, however, to have the film images cross referenced to the related filmless images as shown in FIG. 9. Alternatively, the computer system 22 could have a program that determines from the supplied index information which of the film images 126 are related to the filmless images 134.

If it is determined that a certain film image 126 is related to a filmless image 134 being displayed upon the filmless image display unit 82, the computer system 22 directs the film image display unit motor controller to display the related film image 126. To accomplish this, the computer system 22 is interfaced with the film image display unit motor controller and can transmit address information to the motor controller which operates and moves the film transport belt 128 to a selected address. The transport belt 128 can have position identifying markings applied to it and the motor controller can control positioning of a film image 126 on the belt 128 by reading the markings and using a feedback control loop.

Additionally, a foot pedal can be provided which activates the motor controller to move the transport belt 128 to the left or to the right (or in some cases, up and down) to permit viewing of the desired portions of the film series. As different film images appear in front of the illuminating device, the related filmless images can appear on the filmless image display unit 82. To accomplish this, the detector would communicate a change in position of the transport belt 128 to the computer system 22, which would use the index 140 to determine the related filmless image 134 to display.

To setup the film and filmless display system, a series of digital filmless images 134 and its associated identifying information are first loaded onto the computer system 22. Film images 126 are then placed upon the film transport belt 128. Next, either the computer system 22 uses the detector to read the coded information concerning the film images 126, or an operator uses the scanner to scan the film images 126 for the information concerning the film images and their location upon the transport belt. The computer 22 then creates an index table from the information associated with the film 126 and filmless images 134. Upon the completion of the index table, the computer system 22 will direct the film image display unit motor controller to move the transport belt 128 so that film images 126 which are related to the filmless images 134 are in front of the illumination device for viewing.

It is expected that the film viewer will allow display of four films at the same time, i.e., there are four films on the film transport belt that are located in front of light boxes at any one time. Thus where there are four films in a patient study, those four films will be presented together simultaneously. Where there are more than four films pertaining to a particular patient, the film transport belt will be controlled by computer system in a default mode 22 to slowly "pan" back and forth (i.e. the belt will move left-to-right and the back again if the belt is oriented horizontally, or top to bottom and back again if the belt is oriented vertically) so that all the films relating to a particular patient are slowly passed in front of the light boxes and thereby are visible to the physician. This can be accomplished through the computer system, which chooses particular film images to be presented in a "pan" presentation by determining which patient's records are being reviewed, and presenting the film transport belt positions that contain film images that are for the selected patient.

Hand controller 20, 40 comprises two significant control subsystems. An image control subsystem permits navigation among the images to be displayed by a viewing unit. A dictation subsystem operates to receive voice dictation. Preferably, a wireless transmitter subsystem transmits commands from the image control subsystem and the dictation control subsystem to a personal computer based system 22.

In the present invention, various fields of view are contemplated, including a main viewer 90, a left clipboard viewer 92, and a right clipboard viewer 94. As described in a related copending patent application Ser. No. 08/887,906, entitled "System for Manipulation and Display of Medical Images" filed Jul. 3, 1997, which is hereby incorporated in its entirety by reference, the main viewer 90 can display a filmless image 134 which is then being studied, and the left and right clipboard viewers 92 and 94 serve auxiliary display functions.

Computer system 22 will have installed in it a "Viewer" application software running on Windows 95 (or later version) or Windows NT that responds to the diagnosing physician's use of the controller 20, 40 to implement the commands transmitted from controller 20, 40. Where computer system 22 consists of three separate computers, each computer will have the "Viewer" software loaded on it, allowing each computer and its associated monitor to be simultaneously used by different persons if desired. The use of separate computers with "Viewer" software provides backup systems in the event of the failure of the "master" computer 84.

In the expected environment of use, the computer system 22 will have received a digital "folder" for the patient to be diagnosed. The "folder" will contain patient identifying information, a patient medical history and/or chart; and a series of digital images to be reviewed by the diagnosing physician. Unlike current filmless systems, the patient images stored in the folder will be images selected by a skilled technician in the same way as is now done in conventional radiology film systems. The images in the patient file will be captured at the MRI or other imaging unit by placing a suitable digitizing tablet in the location where films are exposed by the technician. The exact same procedures as in selecting images for film exposure will apply to the filmless images 134 to be captured for use in the present invention. The digital images 134 are preferably provided in a bitmap format, although other formats may be used.

The patient "folder" will typically be named with the name of the patient, e.g. "John Smith." The computer system 22 may receive such patient information via a hospital network, or a modem transmission, or directly from an image capture device such as a MRI unit.

Controller 20 uses a pistol grip with a control end 26 located in an upper end, similar in appearance to a computer joystick used for playing computer games. Controller 40 is a more elongate handheld device with a control end 26 at one end. In the specification following the term "controller 20" shall be used to refer to both controller 20 and 40, as the functions thereof are identical, the sole difference being in their shape.

Controller 20 is preferably shaped to be comfortably held in one hand. At control end 26 of case 24 are provided the controls for operating the image control subsystem and the dictation control subsystem.

Figure 4:
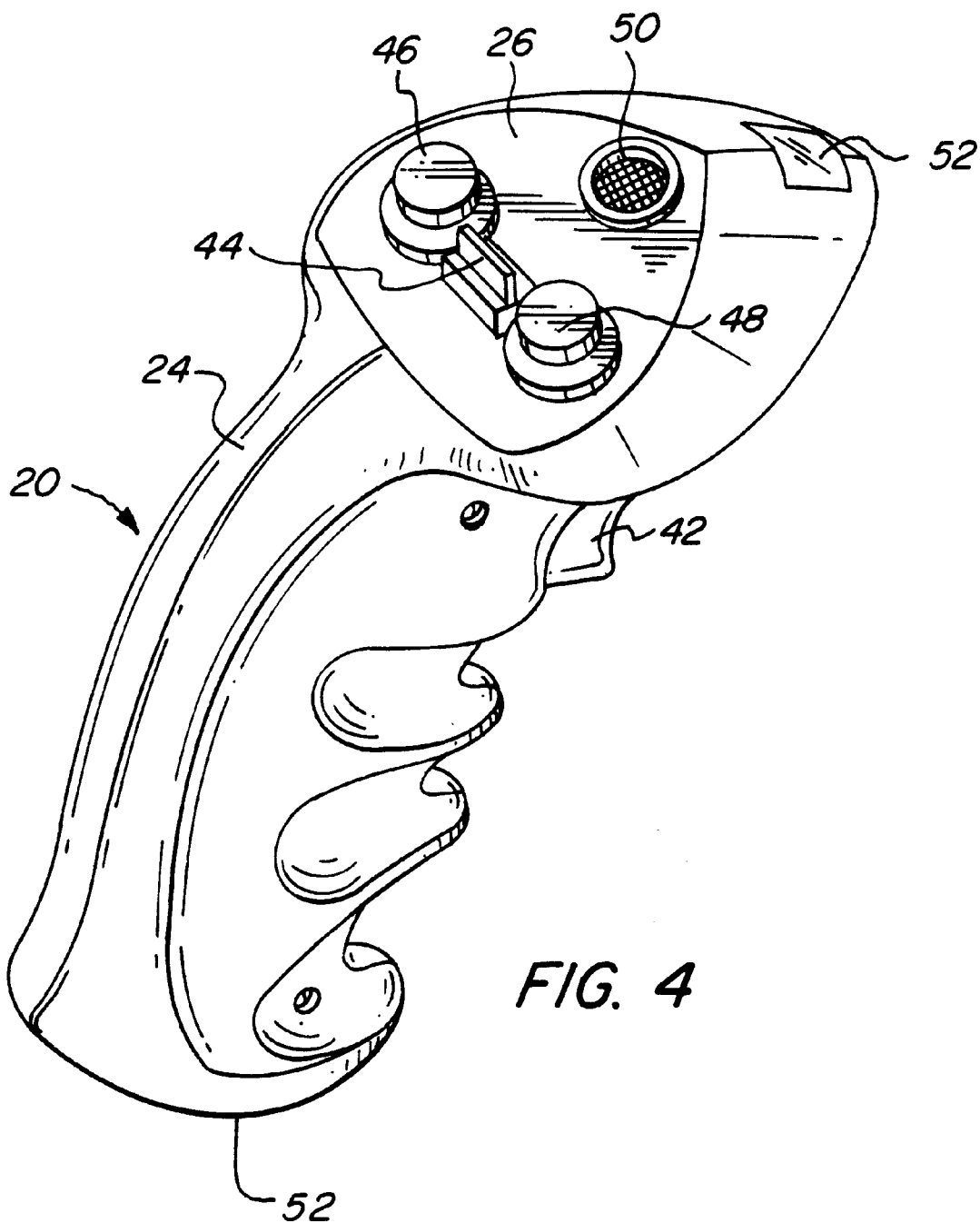
FIG. 4 is a top rear perspective view of a handheld control device for use with the integrated film and filmless image display system of FIG. 1.
Figure 5:
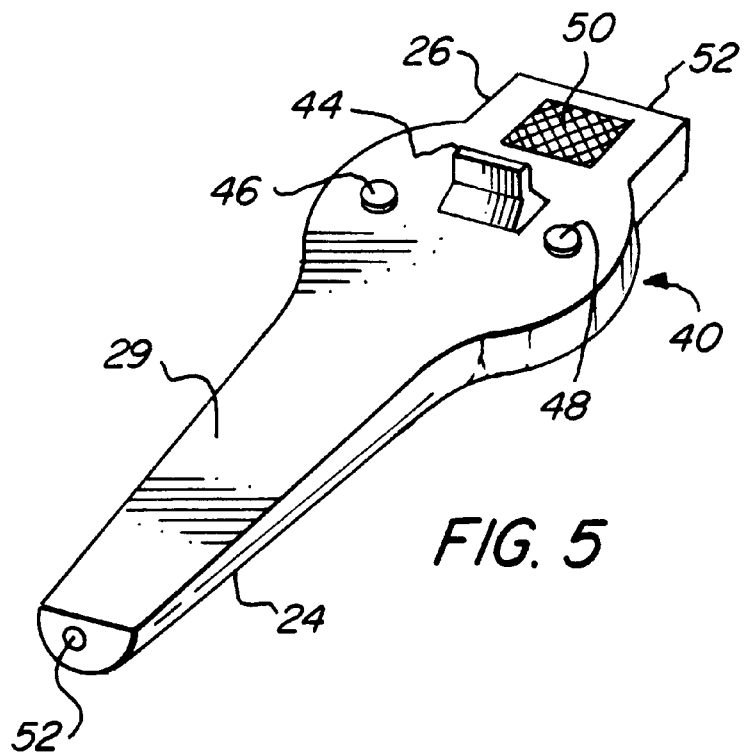
FIG. 5 is a top rear perspective view of another embodiment of the handheld control device for use with the integrated film and filmless image display system of FIG. 1.
Figure 6:
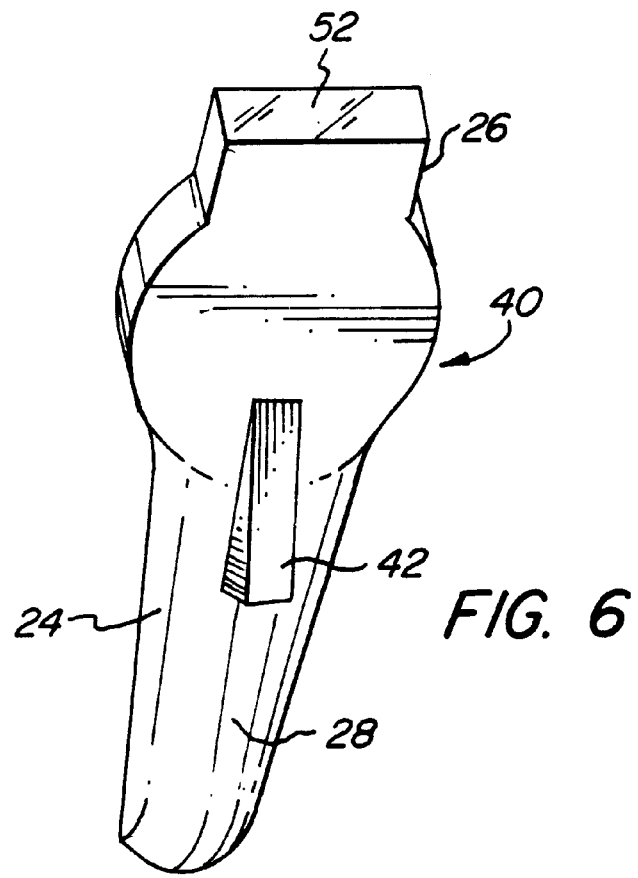
FIG. 6 is a bottom front perspective view of the handheld apparatus for audio dictation and navigation of filmless images of FIG. 5.

In the preferred embodiment, the controller 20 has only four switch elements or assemblies to operate as the dictation control and the image display control: a trigger switch 42 located at the underside 28 of controller 20; a pressure switch 44 located on the upper surface 29 of controller 20; and a left toss button 46 located on the upper surface 29 of controller 20 to the left of pressure switch 44; and a right toss button 48 located on the upper surface 29 of controller 20 to the right of pressure switch 44. With reference to FIG. 4, the trigger switch 42 is located where it may be actuated by the forefinger of the user, while the pressure switch 44 and the left and right toss buttons are located on the upper surface of controller 20 where they may be actuated by the user's thumb. These four switch elements or assemblies provide all necessary inputs to achieve the navigation of images and dictation control. If desired, of course, additional buttons and controls may be added, but it is expected that a minimum of controls will provide the most reliable and user friendly control. The present invention desirably has no more than six switch elements or assemblies for operation of all necessary functions. The reduction of controls is achieved in the present invention by allowing for different types of inputs to each switch assembly, such as double clicking or pressure sensitive switches, that allow for different outputs for each input. This is also achieved in the present invention by providing for the different switch assemblies to operate different functions depending on the current mode of operation of the image display and the audio dictation, or combination thereof, at the time of the input to the control.

It is to be appreciated that other switch elements may be substituted for the preferred switch embodiments described above in connection with the controller 20. For example, in an alternative embodiment, the functions of pressure switch 44 and left and tight toss buttons 46 and 48 described below may be implemented in a joystick type control that is movable from front to back and left to right, or by a four way rocker switch, or a thumbwheel, or a tiny trackball, or a sensitive touchpad, or set of directional arrow keys located in the controller 20. Such variations are all within the scope of the invention.

In addition to the control switches 42, 44, 46, and 48, controller 20 is provided with a microphone 50 to receive voice dictation and convert the dictation to appropriate electrical impulses. In another embodiment, controller 20 may have a jack 52 for receiving a clip-on microphone instead of, or in addition to, the microphone in the controller 20. Microphone 50 is preferably located on the upper surface 29 of controller 20 at its control end 26.

Controller 20 may be attached to the computer system 22 by suitable electrical cabling, however, in the preferred embodiment, controller 20 is a wireless unit that remotely communicates with computer system 22. Such wireless systems are known in the art and may include radio frequency, infrared, or other wireless communications systems. Preferably, controller 20 is provided with a infrared transmitter 52 at its control end 26 for communication with the computer system 22. In such case, the various keyboard interrupts and/or mouse interrupts generated by the controller 20 are communicated via modulated infrared beams transmitted from the infrared transmitter 52 to infrared receivers 54 associated with the computers or workstations of computer system 22 to cause the desired actions. In addition, voice dictation received in microphone 50 and converted to electrical signals are also communicated from the infrared transmitter 52. If desired, a single transmitter 52 may serve to communicate both the control signals and the dictation signals to the infrared receiver, or separate infrared transmitted may be used. In a wireless embodiment, controller 20 is provided with a power source such as suitable batteries to power the functions of the controller 20.

The control switches 42, 44, 46 and 48 generate keyboard interrupt and mouse control signals that control the computer system 22. Such keyboard interrupt and mouse control signals are conventional signals in operation of personal computer operating systems which are generated, respectively, upon the entry of particular keystrokes or clicking the mouse buttons. In a conventional system, for example a Microsoft Windows operating system, event routines are actuated upon pressing a keyboard key as follows: the keyboard chip transmits a message, that a key or combination of keys are pressed, to a buffer, which notes the key and transmits a message identifying an "onkeydown" routine and the key or key combination pressed to the operating system. The operating systems receives this message and posts a message to all open programs when a keyboard interrupt is received; and the program which is the active program (known as the program which has the "focus") responds to the keyboard input. Upon release of the key on the keyboard, the key chip transmits another key indication; the buffer notes the key and transmits a message identifying an "onkeyup" and the key or key combination pressed to the operating system, which then again transmits this message to all open programs, and the active program responds thereto. In the present invention, the controller switches actuate such keyboard interrupts to instruct a "Viewer" application software running on one or more of the master and slave computers 84, 86, and 88.

It is to be appreciated that with the present invention, the controller 20 is intended to be the only necessary control, and thus the conventional keyboard and mouse controls may be omitted from the personal computers that constitute the computer system 22. However, of course, if desired, such interface devices may be included in the computer system 22, as for example, if the present invention is implemented in a single computer at a medical office where the computer may be used for other functions besides review of medical images for diagnosis. However, it is expected that when the "Viewer" software for operation of the personal computers in their function as an computer system 22 is running, that the controller 20 will be the only interface device necessary for a diagnosing physician's control of the computer system 22 to review patient images and to dictate a medical study.

In one preferred embodiment, the following switches and combinations of switches actuate the following functions. Of course, however, the various functions described below may be assigned to other switches or combinations of switches than described in connection with the preferred embodiment, such different assignments being all within the scope of the invention. As described below, the image display control and the dictation control have multiple functions, and at least some of the functions of the image display control and the dictation control are both accomplished through commands generated by actuation of one or more of the switches. The particular control function provided by a switch or combination of switches is dependent on the mode of dictation or mode of image display or combination of modes of dictation and image display at the time of operation of such one or more switches.

The trigger switch 42 actuates the primary functions of the voice dictation system. If the trigger switch 42 is clicked and held down, the microphone 50 is connected to a power source, and a keyboard interrupt is sent to the computer system 22, where the "Viewer" software summons the "audio record" function, and voice dictation by the physician into the microphone is communicated to the computer system 22 and is recorded as a digital file.

Recording continues until the trigger switch 42 is released, which is transmitted as a keyboard interrupt that causes the "Viewer" software to summon a "stop audio record" function. A hold down of the trigger switch 42 will initiate the record function whether in stop or playback mode.

The audio record function, as well as rewind, playback and other audio functions described herein are conventional features in the Windows 95 operating system and are not described in detail herein. It is noted that a sound card will be required to cause the analog to digital conversion needed to store the voice dictation as a digital file. Voice dictation received by the computer system 22 is stored as a Windows ".wav" file for playback using the conventional Windows based audio software. The file may be stored locally on the computer system 22 or in a network file server as selected.

The "Viewer" software will automatically save the voice dictation file each time the trigger switch 42 is released. The "Viewer" software will automatically save voice dictation file under a file name such as "Study Dictation.wav." The file will preferably be automatically saved in the patient "folder."

When the audio system is in neither the record nor playback, if the trigger switch 42 is clicked and released, the playback function is activated. In the audio file currently open by the "Viewer" software, the recorded audio file will back up two seconds from the end of the file and then will playback that portion of the file to the end. When the recorded audio file is being played back, actuation of the trigger switch 42 by a click and release stops the playback. Also, when the recorded audio file is being played back, actuation of the trigger switch 42 by two clicks and release causes the "Viewer" software to jump to the end of the recorded audio file.

When the audio system is in neither the record nor playback, if the trigger switch 42 is clicked twice it will initiate a "rewind" sequence, in which the position in the audio file is moved back, with acceleration after an initial period of "rewind". "Rewind" may be halted by clicking trigger switch 42 once.

When the audio system is in playback mode, as a result of a single click of trigger switch 42, toss buttons 44 and 46 can be used to call additional audio dictation functions. For example, the left toss button 44 can be used to toggle through various dictation functions (with a screen display in a small window showing the various functions selected). These functions preferably include (1) insert additional audio; (2) overwrite audio; and (3) delete audio. Once a dictation function is selected, the right toss button 46 may be clicked during the desired position in playback to mark the position of the desired function, and clicked a second time, where applicable, to mark the end of the function. Thus, where insert additional audio is desired, the right toss button 46 will mark the position of the audio insert; and the trigger switch 42 may be activated to record the audio insert. Where overwrite audio is desired, the right toss button 46 may be clicked to mark the beginning of the portion of the audio file to be overwritten, and clicked again to mark the end of the portion to be overwritten, and the trigger switch 42 may be activated to record the audio insert to the overwritten portion. Where delete audio is desired, the right toss button 46 may be clicked to mark the beginning of the portion of the audio file to be deleted, and clicked again to mark the end of the portion to be deleted.

Other dictation switch designs may also be used in the handheld controller 20. For example, the dictation control switch may be a slide switch actuated by forward and rearward motion. In such an embodiment, the standard dictation controls (record, off, play, fast forward, rewind) are actuated by positioning the slide switch along the longitudinal axis of the controller 20. Thus, recording is actuated by positioning the slide switch at the forward position of its travel. Moving the slide switch backwardly actuates the following modes, in order: stop, playback, fast forward, and rewind. Other switch control systems may also be implemented in accordance with the invention.

The audio file comprising the diagnosing physician's dictated study of the patient images may be converted to a text file by a transcriptionist or by use of voice recognition software. At the time of the present invention, it is expected that a transcriptionist will be required to accurately transcribe the dictated study. However, as vendors such as IBM and others continue to improve voice recognition software, that the services of a transcriptionist may be less needed, and that voice recognition software may be used to convert the recorded audio file to a text file.

In a system using a transcriptionist in a distributed network, a central file server will maintain information on the status of the patient folder and the contents thereof, and will forward a copy of the audio to a transcription station to generate the corresponding text file.

The controller 20 also controls the "Viewer" software to permit the physician to review the images of the patient. Pressure switch 44 is the principal control for the image viewing system. Pressure switch 44 is a strain gauge switch that transmits different keyboard keys as keyboard interrupt instructions to the computer system 22 depending on the amount of pressure applied to the switch. In the preferred embodiment, pressure switch 44 is a thumb actuated rocker bar switch that has a default centered position, and which may be pushed forwardly or pulled backwardly, against a bias that will tend to center the pressure switch in its centered position. Forward pushing on the edge 45 of switch 44 will cause the Viewer software to advance through the image series. Backwards pulling thereon will cause the Viewer software to back up through the image series. The different keys transmitted by pressure switch 44 instruct the computer system 22 to advance or back up through and display the image series at different speeds.

The image series stored in the patient folder in computer system 22 is preferably stored as multiple files, identified for example as 100010001, 100010002, where the terminal four digits 136 identify the number of the image in the series, and the second through fifth digits 138 indicate the number of the series. Actuation of the pressure switch 44 by a single push will cause the Viewer software to display each image file in numeric order, one image at a time, beginning from the first image of the first series. Actuation of the pressure switch 44 by pushing and holding the pressure switch 44 will cause the Viewer software to scroll through the images. The amount of pressure applied to pressure switch 44 will control the speed at which the Viewer software scrolls through the images in the series. The scrolling of images will halt when the end of an image series is reached (or the end of the set of all images reviewed during the study so far), whereupon the first image of the next series will be displayed, and the scrolling function will be terminated. The user may then step or scroll through the displayed next image series by again activating the pressure switch 44. In the preferred embodiment, the physician will be required to step through the entire sets of image series before rapid scrolling will be permitted. This will help to insure that each image is reviewed initially, to prevent missing a potentially relevant image during rapid scrolling.

A serial display as described above is believed to be the most effective way of presenting the images in the patient file, as it maximizes the diagnosing physician's ability to interpret the image using lower cost, standard size computer monitors. However, it is also possible to present the image information in a matrix format with multiple images displayed in a monitor at one time. Such multiple images may comprise a tiled set of windows, each containing a separate image. In such case, the controls of controller 20 will be as described above, except that in stepping or scrolling through images, the Viewer program will step through the different windows.

However, it is believed that a serial display provides a preferable approach as it will force the physician (particularly the experienced physician) to review all the images presented, without the possibility of skipping over a potentially relevant image. With an experienced physician there is sometimes a temptation to leap to the most relevant image—and to reach the obvious diagnosis. With a serial display, a physician will be less likely to miss the less obvious diagnosis that might be reached after proper review of all images. The serial image display is also helpful to the inexperienced physician who will have a better awareness of the entire image set, and what he is looking at, by virtue of the preceding images already displayed. A final benefit of a serial display approach (as opposed to a multiwindow format) is that it allows presentation of a large image. In comparison to film, which has a quality of very high contrast resolution at a certain luminance, current monitors provide much less resolution. To compensate for the reduced contrast resolution, the spacial resolution is enhanced (the image is made larger) to give the user an image of subjective quality that approaches the resolution provided by film.

The "Viewer" software will also determine if the user has displayed a specific image for a predetermined period of time. If so, the Viewer software will "bookmark" for subsequent return. The "bookmark" may be inserted by adding an appropriate stop in the patient image file, or in a table containing a list of the images, or by storing the filename of the displayed image for later recall. Thus, if the diagnosing physician studies the third image in a first series for a period exceeding the predetermined period of time, then steps forward to the third image of the next series, the physician may jump back to the third image of the first series by pulling back on the pressure switch 44. The "Viewer" software, having bookmarked the third image of the first series, will stop backwards scrolling when that image is displayed. In another embodiment of the invention, images studied for a predetermined period of time may be selected to be automatically tossed to one of the clipboard viewer monitors; and/or tossed images may be auto-bookmarked.

The toss buttons 46 and 48 serve two functions. A quick click of a toss button 46 or 48 causes the image currently on view on the main viewer monitor 90 to be separately displayed on the respective clipboard viewer monitor 92 or 94. This is again accomplished by the toss button generating a keyboard interrupt with instructs the "Viewer" program to display the selected image on the selected clipboard viewer monitor, for example, by copying the image to a new file containing images of interest, and displaying the new file. The use of the toss buttons 46 and 48 in this manner also marks the "tossed" image for later use of the comparison function described below. An image that has been "tossed" to a clipboard viewer monitor may be "untossed" (removed from the clipboard viewer) by clicking the toss button for the clipboard viewer when the main viewer monitor 90 has displayed on it the image to be "untossed".

The default "mode" for the "Viewer program" is "view." However, if a toss button 46 or 48 is pressed and held down, it will invoke a "mode selection" function in the main viewer program. The "Viewer" program will display a menu of the various modes on the main viewer monitor or one of the clipboard monitors. In the "mode selection" mode, the pressure switch 44 may be used to cycle through the various modes, accompanied by a display in which a highlighted selection bar down the menu of modes. A mode may then be selected by clicking on the toss button again. Of course, other control schemes may be implemented using the controller 20, for example, upon entering a "mode selection" mode, the toss buttons could be used to cycle through the various modes by clicking the toss buttons, or holding down the toss buttons, to cycle one entry at a time through the various modes, and selection could be made by clicking the trigger switch 42; or the trigger switch 42 could be used to cycle through the various modes and the selection could be made by pressing one of the toss buttons. If the toss buttons are used to cycle through the various modes, one toss button will cycle up through the mode selection menu and the other toss button will cycle down through the mode selection menu. In another embodiment, one toss button might be used to cycle through the mode selection menu and the other toss button would be used to select the particular mode to be implemented. Other mode selection and selection schemes are equally within the scope of the present invention.

In the preferred embodiment, the mode selection process is actuated by holding down one or the other of the two toss buttons. The system cycles through, and displays the names of, different modes as the button is held down, from view, compare, erase, and exit. The mode selection stops at exit and does not run through the cycle again. Cycling through modes is halted by releasing the button. Selection of the mode is accomplished by clicking the button once the desired mode is shown on the screen display. If a mode change is not desired, the mode selection process can be terminated by clicking the toss button opposite from that used to cycle through the various modes.

The "modes" to be selected from may include one or more of the following functions.

(1) List Patients mode. This will cause the system to display the patient folders so that the folder of a patient to be studied can be selected. Upon selection of a patient, the system then enters into view mode.

(2) View mode. This will cause the system to return to the default viewing mode with controller 20 controlling the master computer 84 of the computer system 22 to display images from a patient study in the computer monitors, with simultaneous control of the film transport belt to present films relating to the filmless images. View mode will also turn on lights in the illumination boxes associated with the film viewer when data in the system indicates that there are films associated with a particular patient whose filmless images have been selected during the list patient mode.

(3) Film Belt Control mode. This mode controls the film belt transport to move in incremental steps. Alternatively the belt control can smoothly move the belt. Where no filmless image files have been loaded into the computer system, the film belt control mode can be the default mode, so that holding the left toss button will move the film transport belt to the left, and holding the right toss button will move the film transport belt to the right. If there are no film images associated with a patient study, the film belt control mode may be optionally omitted from the mode rotation during the course of the review of the patient study by the physician. Film Belt Control mode will also turn on lights in the illumination boxes associated with the film viewer (4) Right clipboard control. This will cause the controller 20 to be acting on and controlling the right clipboard viewer monitor 94.

(5) Left clipboard control. This will cause the controller 20 to be acting on and controlling the left clipboard viewer monitor 92.

(7) Compare mode. This will cause one clipboard viewer (preferably the left clipboard viewer monitor 92) to display a side-by-side presentation of all images in two series starting with the first marked image in each series. For example, while in view mode, a diagnosing physician could select the third image of the second series and send it to the left clipboard viewer 92 by marking with toss button 46, and could then select a fourth image of the fourth series and send this image to the left clipboard viewer 92 by marking with toss button 46. The images would then be displayed with the third image in the second series in the top left quadrant of the monitor screen, and the fourth image of the fourth series in the top right quadrant of the monitor screen. The diagnosing physician would then summon the compare mode, which would cause the display of all subsequent images to the selected images in a side by side relationship, with the selected images on top, and the subsequent images below.

(8) Annotate mode. The master computer 84 may be set up with a light pen, allowing the diagnosing physician to annotate the patient image displayed on the main viewer 90. The annotated image may then be saved as a separate file from the original image by using toss button 48 to save it to the right clipboard viewer 94, or upon return to view mode. Screen buttons actuated by the light pen may be provided to step forward or back through the image series and to "toss" an annotated image to the left or right clipboard. A submenu may also be established to select the particular image to be annotated.

(9) Dictation special functions. This menu selection will call a submenu with the insert, overwrite, and delete the dictated audio file functions described above.

(10) Exit study. This will cause the system to close the open files being viewed, and to save the dictated audio file, and to save the summary study prepared by the diagnosing physician as a separate file or files. This will also turn off lights in the illumination boxes associated with the film viewer.

In a preferred embodiment, upon loading of a patient's file, the left or right clipboard viewer will display all the images in the study in a small size presentation, to allow an overview of the study. Typically there will be four images displayed on the clipboard simultaneously. In cases where the clipboard has four or less images, the cycle of the mode selection will place the film display control mode selection prior to the clipboard navigation display; but where there are more than four images, the clipboard navigation mode will be likely to be required first (to allow a complete review of the overview of the study), and so the clipboard navigation control will be selected first in the cycle of mode selection.

Other modes might include a main menu mode, to call a main mode selection menu, if, for example, some or all of the above functions or additional functions are established as submenus to be selected; and a Mark image mode to bookmark the image currently on display in the main viewer, or to bookmark other images as may be selected from a submenu, to subsequently implement comparison and other functions. The light pen might also be used by a non-physician technician to operate various other functions of the computer.

When series of images in a patient study is first opened, the clipboards may be used to provide an overview of the study. For example, the left and right clipboard viewers 92 and 94 might first have displayed in them the center image of each series of images. Other modes of initial display may be provided, such as the first and last image of a series, or all of the images in one or more series in the patient image file. In some patient image studies, there is a "scout slice", which is an orthogonal view of the patient anatomy of interest showing the location of the various slices constituting the image series. Where a scout slice is available, it will preferably remain on display, most preferably as the last image on display on the left clipboard viewer monitor 92.

As prior noted the various functions described above may be assigned to a switch or combination of switches other than the described switch or combination of switches. In this respect, the invention is designed to provide a "context sensitive" control in which various switch combinations achieve different results. For example, as described above, in a dictation edit/revision mode, the physician will not be likely to need the "toss" or "compare" functions, so that the toss buttons 46 and 48 (or other switch elements) may be assigned dictation control functions instead of their usual toss functions. It would also be within the scope of the invention to disable the image advance and retreat functions of a switch such as pressure switch 44 during a dictation edit mode and to assign dictation control functions to that switch during dictation edit mode. Similarly, as described above, when the "mode selection" menu is displayed, the physician is not likely to need the dictation functions, and the trigger switch 42 may be assigned mode selection functions instead of the usual dictation functions.

A further feature of the present invention is a "multimedia" record function. This function will desirably be implemented automatically whenever the dictation trigger switch is activated, or may be limited to the final "Conclusion" which is conventional at the end of any medical diagnostic dictation, or may be applied in some other summary time period. The "multimedia record function" is to record the images being reviewed by the physician at the time the dictation is recorded, enabling a later playback of the dictation with simultaneous display of the images that the physician reviewed at the time of the dictation. The image display will be synchronized to the dictation so that on playback the precise image being viewed at the time of the specific dictation is displayed. The "multimedia record function" may be implemented by recording the file name of the image on display at the time of particular dictation, which may be embedded into the dictation file as a link or using other conventional techniques for slide show type presentations, or by other file list methods.

The above described serial display system for patient images is believed to be the most efficient and user friendly system that may be implemented. However, other possible control systems may also be implemented in accordance with the invention. In an alternative control system, using a pressure switch having additional left and right switch positions in addition to front and back switch settings, it would be possible to control the "Viewer" software to jump among the different image series. Thus instead of scrolling to the end of an image series to obtain the next series, a diagnosing physician could implement the display of the next preceding series at the same image number as being currently viewed by leftward pressure on the switch, or of the next succeeding series by rightward pressure on the switch. This would permit "lateral" movement among the various patient series. Once a new series sequence was selected, the physician could then scroll forwards or backwards through the series as in the above described serial display embodiment. An adjunct clipboard viewer display might also be provided in such case to provide a matrix containing thumbnail size images of all the images in the patient folder, arrayed in columns, with each column containing the images of a different series. The adjunct clipboard viewer would indicate the image being presented to the main viewer by appropriate highlighting or framing, as an aid to navigation among the images in the study.

The present invention provides an convenient and practical apparatus for review of both film and filmless radiographic medical images and has better operational flexibility than any device known in the art.

It should be understood that the foregoing is illustrative and not limiting and that obvious modifications may be made by those skilled in the art without departing from the spirit of the invention. Accordingly, reference should be made primarily to the accompanying claims, rather than the foregoing specification, to determine the scope of the invention.

What is claimed is:

1. An integrated film and filmless image display system, comprising:
   a film image display unit having:
      illumination means;
      an endless film transport belt having a plurality of positions;
      a motor for driving the belt;
      means for retaining film images to said film transport belt; and
      each of said plurality of positions having an address information encoded thereon, a detector for reading address information on said plurality of positions, a motor controller responsive to said detector for controlling said motor to position said film transport belt with a selected position located in front of said illumination means; and
   a computer system having a filmless image display unit for displaying a plurality of filmless images, said computer system being provided with random access memory and means for digital data storage, said computer system having an interface connected to said film image display unit motor controller to transmit a selected address information to said motor controller to cause said motor to operate to position said film transport belt at a selected address.

2. The integrated film and filmless image display system according to claim 1, said further comprising a handheld controller unit for controlling display of one or both of said film images and said filmless images.

3. The integrated film and filmless viewer according to claim 2, wherein said film transport belt is controlled to present films relating to a patient for viewing when filmless images relating to the said patient are simultaneously viewed in said filmless image display unit.

4. The integrated film and filmless viewer according to claim 3, wherein said film transport belt is controlled to present films relating to the patient for viewing by a slow panning motion, when the number of patient films exceed the space available before illumination means.

5. The integrated film and filmless image display system according to claim 2 wherein said handheld controller controls display of said film images independent of control of said filmless images.

6. An integrated film and filmless display system, comprising:
   a computer system having at least one image display unit, and means for digital data storage;
   a motorized film viewer having illumination means, and an endless belt, said belt having a plurality of positions thereon, said belt being movable by operation of a motor to cause one or more said plurality of positions to be located in front of said illumination means, said motor being controlled by a motor controller;
   a series of filmless images stored in said means for digital data storage;
   a series of film images mounted to said endless belt;
   an index table stored in said computer system, said index table containing:
      an identification of one or more filmless image series names,
      an identification of each image in said one or more filmless image series,
      an identification of the position of film images mounted to said endless belt for one or more of said filmless images;
   a filmless display controller for selecting images to be displayed from said series of filmless images;
   said computer system determining the filmless image selected for display, and selecting a film image for display in said motorized film viewer by selecting the related film image position from said index table and transmitting the film image position to said motor controller to cause said motor controller to position the film image in front of said illumination means.

7. An integrated film and filmless display system in accordance with claim 6, wherein said motorized film viewer further comprises position identifying markings applied to said belt, and a belt marking reader, whereby said motor controller can control positioning of a film image position by a feedback loop control.

8. An integrated film and filmless display system in accordance with claim 7, wherein said film images are provided with a bar code label identifying a patient name, an identification of the series, and a position of the film image in the series, and wherein said integrated film and filmless display system further comprises a bar code reader for reading said bar code labels to enter such information into fields in said index table.

9. A method for simultaneous display of film and filmless images, comprising the steps of:
   loading digital filmless images into a digital data storage unit in a computer system, said filmless images having associated information identifying the filmless images;
   providing a film image viewer having a belt with a plurality of film image holding positions;
   placing film images, which film images are related to the filmless images, upon said belt;
   creating an index table from information associated with said filmless images, said index table entering into the index table in the computer system information identifying the film images and the film image holding position of the film images; and
   selecting filmless images for display, said computer system determining a related film image from said index table, said computer system controlling said belt to position said belt with an indexed film image displayed in said film image viewer.

10. An integrated film and filmless image display system, comprising:
   a film image display unit having:
      illumination means;
      an endless film transport belt having a plurality of positions;
      a motor for driving the belt;
      means for retaining film images to said film transport belt; and
      each of said plurality of positions having an address information encoded thereon, a detector for reading address information on said plurality of positions, a motor controller responsive to said detector for controlling said motor to position said film transport belt with a selected position located in front of said illumination means;
   a computer system having a filmless image display unit for displaying a plurality of filmless images, said computer system being provided with random access memory and means for digital data storage, said computer system having an interface connected to said film image display unit motor controller to transmit a selected address information to said motor controller to cause said motor to operate to position said film transport belt at a selected address;
   a handheld controller for controlling display of one or both of said film images and said filmless images; and
   an indexing table relating selected film images to selected filmless images, said computer system controlling display of both said selected film and filmless images, said computer system causing display of a related film or filmless image as determined by said indexing table when a filmless or film image is selected for display.

11. The integrated film and filmless image display system according to claim 10, wherein said handheld controller comprises:
   a finger operated display control for generating commands for controlling display of the filmless images in said filmless image display unit and for generating commands for controlling display of film images in said film viewer, said controller having a mode selection switch for selecting which of said film images and filmless images are to be controlled by said display control.

12. The integrated film and filmless image display system according to claim 10, wherein said display control comprises a mode selection switch which is operable to generate commands to cause said computer system to control viewing of said plurality of filmless images displayed in said filmless image display unit or of said plurality of film images.

13. The integrated film and filmless image display system according to claim 12, wherein said display control has a default mode of operation to control said film image display unit when no film images are loaded to said computer system random access memory.

14. The integrated film and filmless image display system according to claim 12, wherein the mode selection switch presents a user thereof with a plurality of modes, and in which control of said film image display unit is presented as a mode which may be selected earlier in a mode listing if there are four or fewer images in a clipboard viewer.

15. The integrated film and filmless image display system according to claim 12, wherein the mode selection switch presents a user thereof with a plurality of modes, and in which control of said film image display unit is not presented as a mode which may be selected if there are no film images relating to a particular patient as determined in said indexing table.

16. An integrated film and filmless image display system, comprising:

a film image display unit having:
 illumination means;
 an endless film transport belt having a plurality of positions;
 a motor for driving the belt;
 means for retaining film images to said film transport belt; and
 each of said plurality of positions having an address information encoded thereon, a detector for reading address information on said plurality of positions, a motor controller responsive to said detector for controlling said motor to position said film transport belt with a selected position located in front of said illumination means;

a computer system having a filmless image display unit for displaying a plurality of filmless images, said computer system being provided with random access memory and means for digital data storage, said computer system having an interface connected to said film image display unit motor controller to transmit a selected address information to said motor controller to cause said motor to operate to position said film transport belt at a selected address; and a handheld controller for controlling display of one or both of said film images and said filmless images, said handheld controller comprising:
 a finger operated display control for generating commands for controlling display of the filmless images in said filmless image display unit and for generating commands for controlling display of film images in said film viewer, said controller having a mode selection switch for selecting which of said film images and filmless images are to be controlled by said display control.

* * * * *